Patented July 9, 1929.

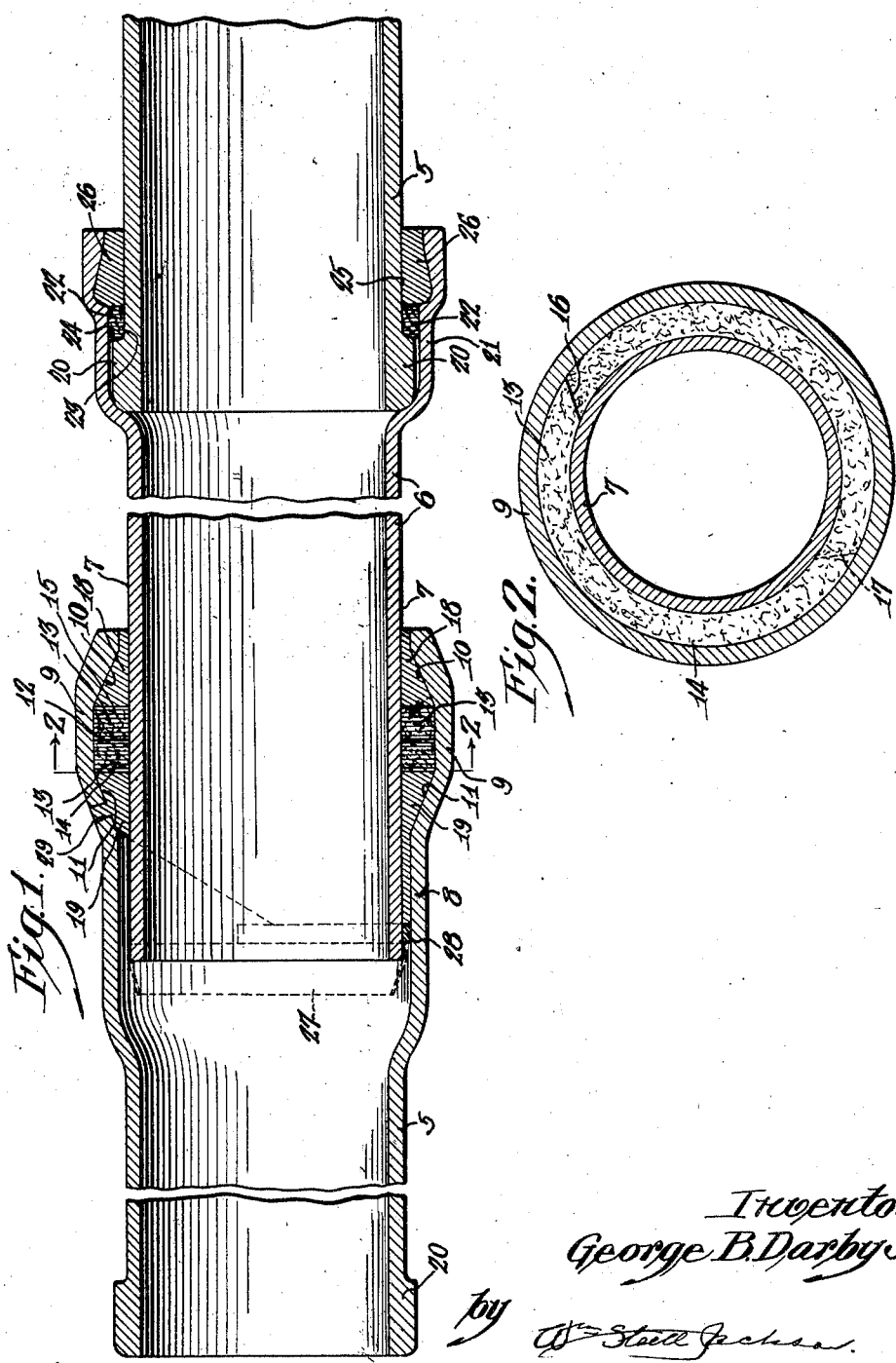

1,720,543

UNITED STATES PATENT OFFICE.

GEORGE B. DARBY, JR., OF GLENSIDE, PENNSYLVANIA.

EXPANSION JOINT FOR PIPES.

Application filed May 7, 1927. Serial No. 189,555.

My invention relates to expansion joints for pipe.

The purpose of my invention is to provide an expansion joint for pipe which will tighten and keep tight packing upon the pipe with movement of the one pipe section with respect to the other in either direction.

A further purpose is to provide the external pipe section of an expansion joint with two oppositely converging internal wedge faces cooperating with corresponding sealing surfaces of packing material located between the sections so that the relative movement of the pipes in either direction will tighten against one of the oppositely facing wedge surfaces, effecting a tightening of the joint in each direction of movement.

A further purpose is to provide one of two expansion joint members with two oppositely facing wedge surfaces cooperating with packing having its longitudinally extending surface tightening the packing against the pipe with relative movement in either direction and to space these packings by an additional packing material of different material.

A further purpose is to provide oppositely facing wedge surfaces upon one of the cooperating members cooperating with a substantially non-resilient packing such as lead in two parts, engaging the respective wedge surfaces and to fill the space between these two parts with a resilient packing.

A further purpose is to make an expansion joint self-tightening in each of its directions of sliding movement.

Further purposes will appear in the specification and in the claims.

I have preferred to illustrate my invention by one form only, selecting this form not only because it is practical, highly efficient and generally desirable, but mainly because at the same time it well illustrates the principles of my invention.

Figure 1 is a longitudinal section through my preferred form.

Figure 2 is a section of Figure 1 taken upon line 2—2.

In the drawings similar numerals indicate like parts.

One of the objections to cast iron pipe has been the difficulty in applying suitable expansion joints within the pipe length. My invention meets this need and at the same time provides an excellent expansion joint for pipe of other types and materials.

As in the case of previous expansion joints for pipe, I prefer to form my joint between two special short sections, one interior end straight and the other exterior end flared, known respectively as the spigot end shown at 5 and the bell end shown at 6.

The bell end is provided with a straight smooth surface 7 which may be chilled or turned or may be ground or shaped by a longitudinal stroke and which slides within the flare 8 of the spigot end.

This flare 8 is additionally enlarged at 9 to provide interior annular opposed wedge shaped surfaces 10 and 11, converging both ways from an intermediate section 12 within which is located a somewhat resilient packing 13.

It will be noted that the flare within which the packing is placed for my expansion joint need be no larger than the normal flare of the bell end of the pipe for other joints, standardizing the pipe joints in this particular.

For convenience in insertion within the flare, and in order to be able to break the joints between parts of the packing 13 I form this packing in two rings 14 and 15 whose cuts 16 and 17 are spaced angularly about the circumference so that the side face of each ring seals against the cut in the surface of the other.

On each side of the packing between the straight section 7 and the wedge surfaces 10 and 11 respectively, of the flare I place a substantially non-resilient packing 18, 19 for which lead is best suited. It bears tightly against the smooth straight exterior surface 7 upon the inside and against the respective wedge surfaces on the outside, so as to tend to wedge the packing 18 inwardly against the surface 7 by engagement with the wedge surface 10 when movement of the two sections tends to separate them and to wedge the packing 19 against the surface 7 by engagement with the wedge surface 11 when movement of the sections tends to bring them together.

The spigot and bell ends are shown as terminating in a ring 20 and a flare 21 respectively, to cooperate with a flare and ring upon the adjoining ends of other pipe sections and a permanent joint is made between the spigot and bell ends respectively and the adjoining pipe. An example of one such form of joint is shown in the upper part of Figure 1 in which any suitable packing is filled in at 22 between the portion 23 of the flare and the pipe at 24 adjoining the ring 20. The space within the portion 25 of the flare and the pipe is then filled with lead at 26.

In assemblage, the packings 13 are inserted first. This is made easier by forming it in the two separate sections as they can be inserted one at a time within the flare and against a support held in place from the other end.

After the packing 13 is in position within the flare the straight end of the bell section can be inserted, using a shield, such as is dotted in at 27 in Figure 1, as a guide and protection against injury to the packing. The shield being slightly collapsible can be withdrawn through the opposite end of the spigot section 5 after the parts have been placed in the relative positions shown. Plumber's wax or other material is inserted at 28 to form a dam to restrict the flow of the lead.

The two sections 5 and 6 together are then tilted with the bell end down at an angle of say 60° and lead is poured between them through an opening 29 which is finally filled and thus sealed by the lead. The sections are then turned upside-down, in approximately vertical position and the lead portion 18 is poured so as to fill the space as shown. It will be obvious that the lead shown as within the filling opening is greatly exaggerated in size in the filling and would shear off quickly in actual movement when the lead annulus with which it is shown connected moves with respect to the surface 11 to wedge the lead inwardly against the interior pipe.

As will be seen my joint automatically tightens for relative movement of the sections, giving exactly the same operation in each direction of movement, namely, tightening the lead of one of the packings against the smooth surface 7 by wedge pressure of one of the interior wedge surfaces 10 or 11 operating on the exterior wedge surface of the lead. In the meantime the composition packing affords a seal also and gives some resilience of pressure against the two lead sections, securing the advantages of the two types of seal, composition and lead.

In practice my expansion joint yields to longitudinal tension or pressure and allows the straight section to slide bodily through the packing at a small fraction only of the tension or pressure withstood by the normal pipe joints, thus thoroughly protecting them not only from separation but from all serious strain.

In view of my invention and disclosure variations and modifications to meet individual whim or particular need will doubtless become evident to others skilled in the art, to obtain part or all of the benefits of my invention without copying the structure shown, and I, therefore, claim all such in so far as they fall within the reasonable spirit and scope of my invention.

Having thus described my invention, what I claim as new and desire to secure by Letters Patent is:—

1. An expansion pipe joint comprising an interior straight section, an exterior flared section large enough near its end to surround the straight section and to permit axial movement of the straight section and having a packing chamber around the straight section containing interior annular opposed wedge-shaped walls, and lead packings between the sections, one packing engaging one wedge-shaped wall when the interior section is moved relatively in one direction, the other packing engaging the opposite wedge-shaped wall when the interior section is moved relatively in the other direction, the straight section being adapted in both directions of movement to move bodily within the packings.

2. An expansion joint for pipe comprising an outer section having interior annular opposed wedge surfaces, lead packings within and conforming to the wedge surfaces, resilient packing between the lead packings and a straight section fitting the interiors of the lead packings, extending through them and adapted to move bodily through them in expansion and contraction of the pipe.

GEORGE B. DARBY, Jr.